United States Patent [19]

Mashimo et al.

[11] Patent Number: 5,201,923
[45] Date of Patent: Apr. 13, 1993

[54] STOICHIOMETRIC B1-TYPE TANTALUM NITRIDE AND A SINTERED BODY THEREOF AND METHOD OF SYNTHESIZING THE B1-TYPE TANTALUM NITRIDE

[75] Inventors: Tsutomu Mashimo; Minoru Nishida, both of Kumamoto; Susumu Yamaya; Hisashi Yamasaki, both of Kawasaki, all of Japan

[73] Assignee: Toshiba Tungaloy Co., Ltd., Kawasaki, Japan

[21] Appl. No.: 735,923

[22] Filed: Jul. 25, 1991

[30] Foreign Application Priority Data

Jul. 27, 1990 [JP] Japan ................................ 2-199622
Apr. 30, 1991 [JP] Japan ................................ 3-124447

[51] Int. Cl.$^5$ ...................... C01B 21/06; C04B 35/58
[52] U.S. Cl. .................................. 23/293 R; 51/307; 423/409; 501/96; 501/97; 501/98
[58] Field of Search .................... 501/96; 423/409; 51/307; 23/293 R

[56] References Cited

U.S. PATENT DOCUMENTS

| | | | |
|---|---|---|---|
| 3,242,006 | 3/1966 | Gerstenberg | 423/409 |
| 4,636,480 | 1/1987 | Hillig | 501/96 |
| 4,655,830 | 4/1987 | Akashi et al. | 501/96 |
| 4,863,881 | 9/1989 | Ahrens et al. | 501/96 |

FOREIGN PATENT DOCUMENTS 63-201006 8/1988 Japan.
264365 3/1970 U.S.S.R. ................................ 423/409

OTHER PUBLICATIONS

O. Matsumoto et al., "Formation of cubic tautalum nitride by heating hexagonal tautalum nitride in a nitrogen-argon plasma jet," *Journal of the Less-Common Metals*, 60, No. 1 (Jul. 1978), 147-149.

*Primary Examiner*—Wayne Langel
*Attorney, Agent, or Firm*—Foley & Lardner

[57] ABSTRACT

The object of the present invention is to provide a stoichiometric B1-type tantalum nitride and a sintered body thereof.

A B1-type tantalum nitride and a sintered body thereof, wherein a stoichiometric B1-type tantalum nitride is produced typically according to the method of impact compression, having the properties (a) that the X-ray diffraction substantially shows a pattern ascribed to the stoichiometric B1-type tantalum nitride alone but not others, (b) that the measured value of the lattice spacing D (h, k, l) has a deviation of 0.00013 nm or less from the corresponding value calculated based on the B1 structure, (c) that the lattice constant is 0.4335~0.4338 nm, (d) that the electron diffraction image substantially shows the spots particular to the stoichiometric B1-type tantalum nitride alone but not others and (e) the value of Z in TaN$_z$ is within a range of 0.96-1.01.

19 Claims, 4 Drawing Sheets

X Ray Powder Diffraction Patterns (a) Starting material Hexagonal crystal system (b) After impact compression
Po=13%
V(impact)=1.326Km/s (c) After impact compression
Po=56%
V(impact)=1.341Km/s (d) After impact compression
Po=70%
V(impact)=1.335Km/s (2θ)

X Ray Powder Diffraction Pattern

STOICHIOMETRIC B1-TYPE TANTALUM NITRIDE AND A SINTERED BODY THEREOF AND METHOD OF SYNTHESIZING THE B1-TYPE TANTALUM NITRIDE

BACKGROUND OF THE INVENTION

The present invention relates to a stoichiometric B1-type tantalum nitride and a sintered body thereof and to a method of synthesizing the stoichiometric cubic or B1-type tantalum nitride by impact compression.

The tantalum nitride with a B1-type crystal structure has the excellent properties such as high hardness, stability at high temperatures and superconductivity, as compared with hexagonal tantalum nitride.

However, it is technically difficult to synthesize the compound and no attempts have been made to produce it but for by the following means:

(1) Kieffer et al. demonstrated that the B1-type tantalum nitride could be formed by heating a hexagonal tantalum nitride at 1700° C. or higher under high pressure in a nitrogen gas atmosphere (Monatshefte fur Chemie 102, 483-485 (1971)). The obtained substance was found to have a lattice constant of 0.4344~0.4357 nm and to be a mixture with $Ta_2N$ in the form of a powder having a small nitrogen content.

(2) Boiko et al. obtained a B1-type tantalum nitride by heating a hexagonal tantalum nitride at 1800° C. or higher under the high pressure of 30-100 Kbar, confirming that the resulting B1-type tantalum nitride showed superconductivity at 6.5K (JETP Lett. 12, 70(1970)). The resulting substance was found having a lattice constant of 0.4385±0.0001 nm and to be a mixture with $Ta_2N$ in a bulk form.

(3) Matsumoto et al. obtained a B1-type tantalum nitride by heating a hexagonal tantalum nitride in an Ar-$N_2$ mixed plasma jet and then quenching the material, confirming that the resulting B1-type tantalum nitride exhibited superconductivity at 8.3K (Common Met. 60, 147 (1978)). The resulting substance was found to have lattice constant of 0.433 nm and to be a mixed powder of $Ta_2N$ and hexagonal TaN.

(4) Matsumoto et al. obtained a B1-type tantalum nitride by nitriding a plate of tantalum with an Ar-$N_2$ mixed plasma jet under the pressure reduced to 200 Torr, confirming that the resulting B1-type tantalum nitride exhibited superconductivity at 9K (Journal of Ceramic Industry Association 95 [1] 1987, 92-93)). The resulting substance was found to have a lattice constant of 0.433~0.434 nm and to be a thin film represented by the chemical formula of $TaN_{0.85-0.95}$.

(5) Kawada et al. filed a patent application (Japanese patent Laid Open No. 29269/1987) for a method of producing a very fine powder of B1-type tantalum nitride wherein a laser beam was irradiated to a hexagonal tantalum nitride powder in an Ar gas under the pressure of 50~760 Torr and immediately thereafter the atmosphere was quenched. The resulting substance was found to be a very fine powder but its chemical composition, lattice constant and the like are unknown. It appears that this method can hardly be put to use for mass production because of its low yield of B1-type tantalum nitride.

(6) Petrumiu et al. synthesized a B1-type tantalum nitride by combusting a tantalum mass itself in a nitrogen gas atmosphere under high pressure and at a high temperature (Poroshkovaya Metalluragiya, No. 3, 62(1980)). The resulting substance was found to have a lattice constant of 0.431 nm and to be a powder represented by the chemical formula of $TaN_{1.15-1.25}$.

These B1-type tantalum nitrides obtained according to the prior arts have been non-stoichiometric compositions or mixtures with $Ta_2N$, hexagonal TaN or the like, as some are denitrified or some comprise excessive nitrogen as a part of their forced solid solution, each representing a big departure from the stoichiometric composition as it should be. In the final analysis, any stoichiometric B1-type tantalum nitrides have not as yet been obtained as a material having the industrial usefulness. The reason for this lies in the fact that B1-type tantalum nitrides are hard to stabilize at ordinary temperatures and under ordinary pressure, because they are a phase of high temperature and high pressure.

SUMMARY OF THE INVENTION

An object of the present invention is to provide a stoichiometric B1-type tantalum nitride and a sintered body thereof which solves the above problems and has industrial usefulness.

Another object of the present invention is to provide a method of synthesizing the B1-type tantalum nitride which is close to being a stoichiometric compound and which is mass producible, wherein a starting material comprising stoichiometric hexagonal tantalum nitride having a porosity of 30% or more is compressed by propagating a shock wave and thereby the stoichiometric hexagonal tantalum nitride is converted to the stoichiometric B1-type tantalum nitride.

The present inventors have performed intensive experiments with the thought that a stoichiometric B1-type tantalum nitride can be obtained from a high porosity mass of stoichiometric hexagonal tantalum nitride under instantaneous high temperature and high pressure produced by impact compression. And it is expected that the microsecond order duration of the high pressure-high temperature can freeze the B1-type phase and substantially prevent denitrification. This result has been realized by the present invention.

Namely, the compound of the present invention occurs as a stoichiometric B1-type tantalum nitride, having the following properties:

(a) that the x ray diffraction using the Cu-K α ray substantially shows a pattern ascribed to the stoichiometric B1-type tantalum nitride alone but not others and (b) that the electron diffraction image substantially shows the spots ascribed to the stoichiometric B1-type tantalum nitride alone but not others.

(c) that the value of z in the formula of $TaN_z$ is within a range of 0.96-1.01.

Other than the stoichiometric B1-type tantalum nitride, the inevitable impurities may be contained therein.

The words "diffraction pattern ascribed to the stoichiometric B1-type tantalum nitride" as set forth in (a) above have the defined meaning that the diffraction of $2\theta = 45°$ or more does not show any of the pattern particular to $Ta_2N$, hexagonal TaN and the like under the X-ray powder method using the Cu-K α ray, as shown in FIG. 1.

The words "substantially shows the spots ascribed to the stoichiometric B1-type tantalum nitride alone but not others" have the defined meaning that any other diffraction spots than those which are theoretically predictable of the B1-type phase are not shown.

The word "porosity" means the ratio, expressed as a percentage, of the volume of the pores involved in a mass.

BRIEF DESCRIPTION OF THE DRAWINGS

FIG. 5 is a diagram showing X-ray powder diffraction patterns ascribed to; (FIG. 5a) hexagonal tantalum nitride used as the starting material in Example 3; (FIG. 5b) the sample 1 obtained in Example 3; (FIG. 5c) the sample 2 obtained in the examples; and (FIG. 5d) the sample 3 obtained in the examples.

DESCRIPTION OF THE PREFERRED EMBODIMENT

Figure 1:
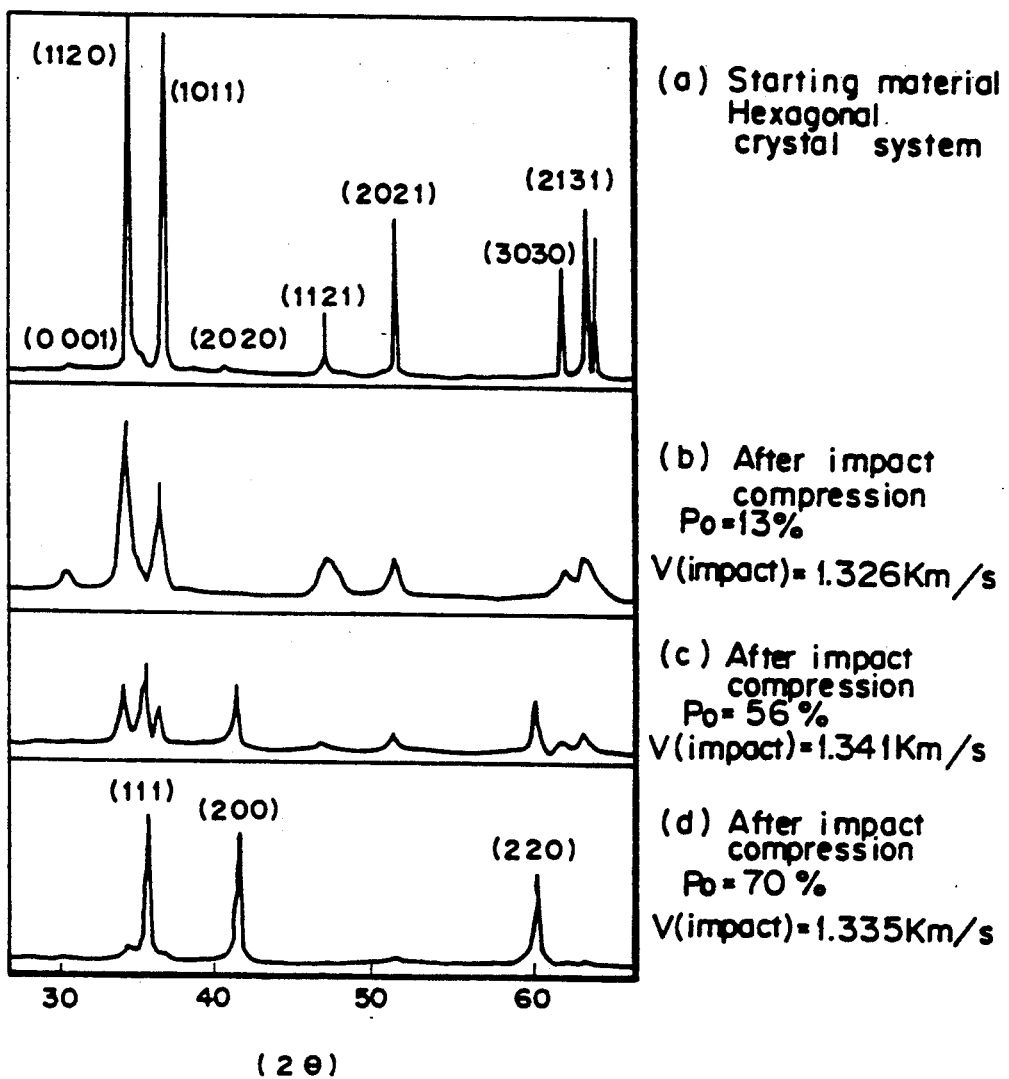
FIG. 1 (a) is a diagram showing the X-ray powder diffraction pattern obtained from hexagonal tantalum nitride powder prepared as a starting material for the impact compression experiments. On the other hand, diagrams (b), (c) and (d) are X-ray diffraction patterns obtained from resultant sample powders recovered from products that were produced by the impact compression experiments using the starting hexagonal tantalum nitride powder. The diagram (b) is a diffraction pattern obtained from the recovered sample powder which started from a sintered mass of the starting material with a porosity of about 13%. The diagrams (c) and (d) are diffraction patterns from the recovered powders which started from powder masses of the starting material with porosities of about 56% and about 70%, respectively. The thickness of impact plate is 2 mm and the impact velocity is set in a narrow range of 1.32–1.34 km/s in all cases above.

The stoichiometric B1-type tantalum nitride of the present invention preferably has a lattice constant of 0.4335~0.4338 nm at ordinary temperature and under ordinary pressure. Namely, the lattice constant of the B1 structure preferably is in a range of 0.4335~0.4338, determined by fitting the data of X-ray powder diffraction pattern under the Cu-K $\alpha$ method to the pattern of the B1-type structure (cubic crystal system) by the least squares.

Further, of the stoichiometric B1-type tantalum nitride of the present invention, the measured value of the lattice spacing D (h, k, l) thereof preferably has the deviation of 0.00013 nm or less from the corresponding value calculated for the B1-type structure. As used herein, the deviation between the measured value and the calculated value of the lattice spacing D (h, k, l) means the difference of said measured value from the ideal value D of the B1-type structure which is obtained by applying the lattice constant a to the equation $1/D^2 = (h^2 + K^2 + l^2)/a^2$.

The stoichiometric B1-type tantalum nitride of the present invention preferably is in a bulk state. As used herein, bulk state means a consolidated mass.

Now the method of synthesizing the stoichiometric B1-type tantalum nitride of the present invention will be described in detail.

The stoichiometric B1-type tantalum nitride of the present invention can be obtained through a method of impact compression wherein a shock wave is propagated in a starting material containing stoichiometric hexagonal tantalum nitride. The stoichiometric hexagonal tantalum nitride a converted into the stoichiometric B1-type tantalum nitride under high pressure and high temperature produced by the impact compression. And the very short duration of the high pressure and high temperature produced by the impact compression can freeze the B1-type crystal structure and prevent the stoichiometric composition of the produced B1-type tantalum nitride.

The starting material is prepared in the form of a powder, compressed powder, or sintered mass which substantially consists of stoichiometric tantalum nitride. Other than the hexagonal tantalum nitride, the starting material may contain some amount of other materials that should serve as the catalyst in converting the hexagonal tantalum nitride into the B1-type tantalum nitride. The hexagonal tantalum nitride in the starting material preferably has a mean particle size of 10 μm or less and more preferably 5 μm or less.

It is very essential in the present invention that the starting material have a porosity of 30% or more, preferably 50% or more, more preferably 70% or more. The high porosity of the starting material serves in producing high temperature during the impact compression. The porosity of the starting material has a significant effect on the convertibility of the hexagonal tantalum nitride to the B1-type tantalum nitride during the impact compression.

In order to propagate the shock wave to the starting material, there can be used a cylinder method wherein, for example, the starting material is packed in a container outside which is placed a prescribed amount of explosive. Alternatively, a metal cylinder is placed outside and the prescribed amount of explosive is placed between the container and the cylinder so that the explosive is fulminated to develop the cylinder-converged shock wave or mach axis and propagate it to the starting material through the container, or said explosive is fulminated to bump the metal cylinder on the container and propagate the cylinder-converged shock wave or mach axis directly to the starting material.

In addition, other shock wave methods can also be applied, including a method of using the plane shock wave wherein the container packed with the starting material is placed inside a reactor, a flyer plate made of metal or the like is hurtled at a high velocity by a compressed gas or a combustion gas of powder or explosive, bumping into one end of the container, and the resulting shock wave is propagated to the starting material or the plane shock wave developed by explosion is propagated as it is directly to the starting material.

The thicker the flyer plate, the longer the compression time so that it is preferable to use as thick a flyer plate as permissible in this step.

The shock wave may be longitudinal, traverse or oblique waves, and is not subjected to any particular limitation. It is preferable, as compared with static methods, that the shock wave having high energy should be propagated to the inside of the starting material within an extremely short period of time in order to prevent denitrification and expedite conversion to the crystal structure.

According to the present invention, there is provided a sintered body of B1-type tantalum nitride wherein at least 10 vol % of stoichiometric B1-type tantalum nitride is contained as an independent phase and the remainder thereof is comprised of other substances. As used herein, the words "at least 10 vol % of stoichiometric B1-type tantalum nitride is contained as an independent phase" have the defined meaning that at least 10 vol % of B1-type tantalum nitride having the desired properties are contained therein, whether it is granulate, lamina, film or in whatever other forms. Likewise, the words "a sintered body wherein the remainder thereof is comprised of other substances" have the defined meaning that the parts thereof excluding said B1-type tantalum nitride are composed of a substance and/or substances containing metal, ceramic, very hard substance, glass, inorganic substance or mixture thereof, compound thereof and solid solution thereof which are bonded to said B1-type tantalum nitride through the diffuse sintering phenomenon.

For the use requiring high hardness, the content of stoichiometric B1-type tantalum nitride preferably is 20 vol % or more and more preferably 30 vol % or more.

As the further description of "other substances" making up parts of the sintered body, it should be pointed out that they preferably are one or more substance selected from the group consisting of metal in the 4a, 5a and 6a groups of the periodic table, Mn, Fe, Co, Ni, Al, Si and compound thereof, solid solution thereof, alloy thereof or diamond, cubic boron nitride or Wurtzite structured boron nitride and their specific examples include such metals as Ti, Zr, Hf, V, Nb, Ta, W, Cr, Mo, Mn, Fe, Co, Ni and Si, such compounds as TiC, TiN, $TiB_2$, SiC, $Si_3N_4$, AlN, $AlB_2$, $Al_2O_3$, NbN and WC, such solid solutions as Ti(C, N), (Ti, Ta)C, (Ti, W)C, (Ti, W) (C,N), (Ti, Ta, W)C, (Ti, Ta,W) (C, N), (Ti, Zr)B, (Ti, Ta)B, (Ti, Al)N, such alloys as $TiFe_2$, TiCo, $TiNi_3$, TiAl, $TiMn_2$, $NbAl_3$, $NiAl_3$, ZrAl, CuNi, NiCr, NiMo, NiCrMo, such very hard substances as diamond, diamond like carbon, cubic boron nitride and Wurtzite structured boron nitride and the like.

In addition to those mentioned above, there are practically included substances which are compounds, solid solutions and alloys comprising said elements cannot be identified by the X-ray powder method.

There are two particularly preferable compositions in the sintered body of the present invention and one of them is a sintered body of B1-type tantalum nitride wherein "other substances" are one or more substance selected from the group consisting of metal in the 4a, 5a and 6a groups of the periodic table, Mn, Fe, Co, Ni, Al, Si, compounds thereof, solid solutions thereof, alloys thereof, diamond, cubic boron nitride and Wurtzite structured boron nitride and another a sintered body of B1-type tantalum nitride wherein "other substances" are one or more substance selected from the group consisting of carbide, nitride, oxide, silicate and boride of metal in the 4a, 5a and 6a groups of the periodic table, Al, Si and mutual solid solution thereof and one or more substance selected from the group consisting of metal in the 4a, 5a and 6a groups in the periodic table, Mn, Fe, Co, Ni, Al, Si and mutual alloys thereof.

These sintered bodies have very high hardness and are best suited for a material intended for use in a tool including cutting tools, wear-proof tools and the like.

Among them, the following is best suited for the use in tools:

Mn and metals in the iron group are best suited for the use in sintered bodies containing diamond as the very hard substance, while compounds and alloys of Al and Si and mixture thereof are best suited for the use in sintered bodies containing CBN as the very hard substance.

Sintered bodies not containing very hard substances preferably are comprised of compound, alloy and mixture of Al and metal in the iron group [specific examples include $Al_2O_3$, AlN, $AlB_2$, $AlB_6$, $AlB_{12}$, $Si_3N_4$, (Al, Si) (O, N).]

Further, Al and alloys and compounds thereof have a high bonding strength with the B1-type tantalum nitride and are best suited for use in its sintered bodies.

An example of the method of producing the sintered body is shown, as follows:

An other substance, for example a solid solution of $(50W-30Ta-20ti)N_7C_3$ is prepared ahead of time in the following way: a mixture of single compounds or that of single compound with composite compound is treated to make a solid solution at a high temperature under high vacuum such as 2000° C.-1Hr, and the resulting solid solution is subjected to fine grinding by a ball mill to the extent of the particle size of about 1 $\mu$m. To the resulting powder, a powder of stoichiometric tantalum nitride and, if need be, that of very hard substance and metal (for example the powder of Al and Co) are added and mixed by the ball mill again.

The resulting mixture is enclosed in a capsule made of metal having a high melting point, for example, Mo or Zr and sintered under ultrahigh pressure and at a very high temperature. In this production process, it is preferable to carry out the steps from grinding to enclosing the mixture into the capsule in a non-oxidation atmosphere, for example Ar or $N_2$ gas atmosphere.

Examples of ultrahigh pressure and very high temperature generator include equipment disclosed in Japanese patent publication No. 14/1963 and the desired sintered body is produced by using said generator or the like, maintaining the pressure of 40~60 Kb and the temperature of 1200~1500° C. for 5~15 minutes, then quenching and depressurizing.

It is needless to say that the desired sintered body can also be obtained by a method of composite sintering wherein the capsule of high melting point metal at first is charged with sintering material such as very hard alloy, then the mixture is loaded on top thereof and the packed capsule is subjected to sintering treatment.

An example of the use of sintered body is shown; the stoichiometric tantalum nitride is hardest of all transition metals and highly deposition proof and highly oxidation proof, exhibiting the useful function when it is contained in a sintered material intended for use in cutting tools and wear resistant tools.

The stoichiometric B1-type tantalum nitride and the sintered body thereof, both having the industrial usefulness (particularly as a bulk material), have been made available for the first time by the present invention. The B1-type tantalum nitride can be used as a cutting tool or a very hard, wear proof material such as superconducting or grinding materials.

The present invention will be described below in detail referring to the examples and comparative examples, but it is not limited in any way by those examples.

EXAMPLE 1

Synthesizing experiments were performed by using a powder propellent gun with a key. Stoichiometric hexagonal tantalum nitride that was used as starting material occurred as pole or plate like particles about 1 μm long and about 0.2 μm wide on average. The starting materials were prepared in the form of one sintered mass and two powder masses. The sintered starting material had the porosity of 13%, and was charged in an iron capsule. The two powder starting materials were charged, respectively, in each iron capsule so that its porosity was about 50% and about 70%. The impact plate was made of tungsten with a 1.2 mm thick and the impact velocity ranged from 1.2 to 1.6 km/s.

Figure 3:
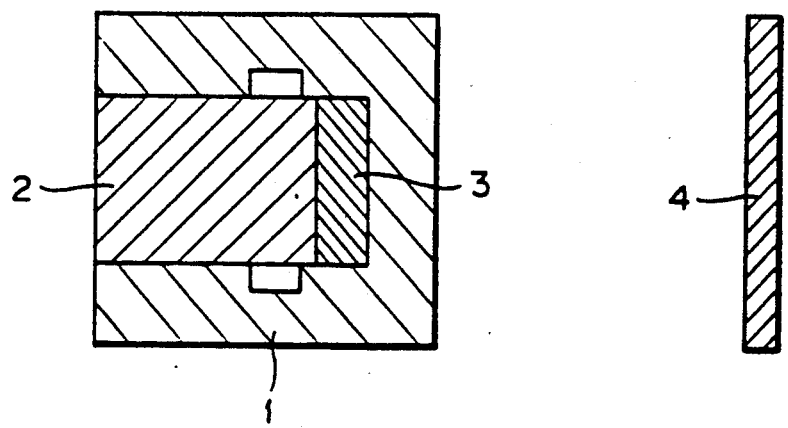
FIG. 3 is a cross section showing the configuration of a container and a flyer plate as used in the method of producing the B1-type tantalum nitride of the present invention.

The method of impacting will be described in detail. As shown in FIG. 3, the hexagonal tantalum nitride powder (3) was packed in the iron container (1), fixed by the iron plug (2) which was screwed so that the powder had the previously prescribed density. The container arranged as in FIG. 3 was installed within an apparatus wherein the container could be shocked by a powder propellent gun. Next, a tungsten laminated-flyer plate (4) was hurtled at a high velocity by the combustion gas of the explosive, bumping into the container (1), developing the shock wave and propagating the shock wave to the inside of the compressed powder.

The resulting B1-type tantalum nitride was analyzed according to the various methods.

FIG. 1(a) is a diagram showing X-ray powder diffraction pattern obtained from hexagonal tantalum nitride powder prepared as a starting material for the impact compression experiments. On the other hand, diagrams (b), (c) and (d) are X-ray diffraction patterns obtained from resultant sample powders recovered from products that were produced by the impact compression on the starting materials. The diagram (b) is a diffraction pattern obtained from a recovered sample powder which started from a starting material of the sintered mass with the porosity of about 13%. The diagrams (c) and (d) are diffraction patterns from the recovered powders which started from powder masses with porosities of about 56% and 70%, respectively. The thickness of the impact plate is 2 mm and the impact velocity is set in a range of 1.32–1.34 km/s. The initial pressure developed inside the impacted specimens of 56% porosity and 70% porosity were found to be about 20 and 12 GPa, respectively. Although no substantial changes are found in the diffraction patterns of FIG. 1(b) comparing with FIG. 1 (a), the diffraction pattern of FIG. (c) and (d) showed the peaks which did not appear in that of FIG. 1(a). The result of the fitting by the least squares indicated that the peaks were completely identical to those of a compound having the B1-type structure.

Moreover, the higher the porosity and higher velocity, the better the recovery rate and the rate of recovered samples rose to about 90%, when their starting material had the cavity volume ratio of 70%. These findings support that the B1-type phase is a phase of high temperature and high pressure and are not in conflict with the fact that the synthesis is achieved by static compression of 3 GPa or more and at a temperature of 1700° C. or higher. The resulting tantalum nitride having the B1-type structure was found having the lattice constant of 0.43363±0.00001 nm.

TABLE 1

Recovery Rate of B1-type Tantalum Nitride (Conversion Rate)

| Cavity Volume Ratio (%) | Impact Velocity (Km/s) | Thickness of W plate (mm) | Recovery Rate of B1 Phase (%) |
|---|---|---|---|
| 13 | 1.326 | 2 | 0 |
| 56 | 1.341 | 2 | 57 |
| 70 | 1.335 | 2 | 89 |
| 70 | 1.419 | 2 | 100 |

Figure 4A:
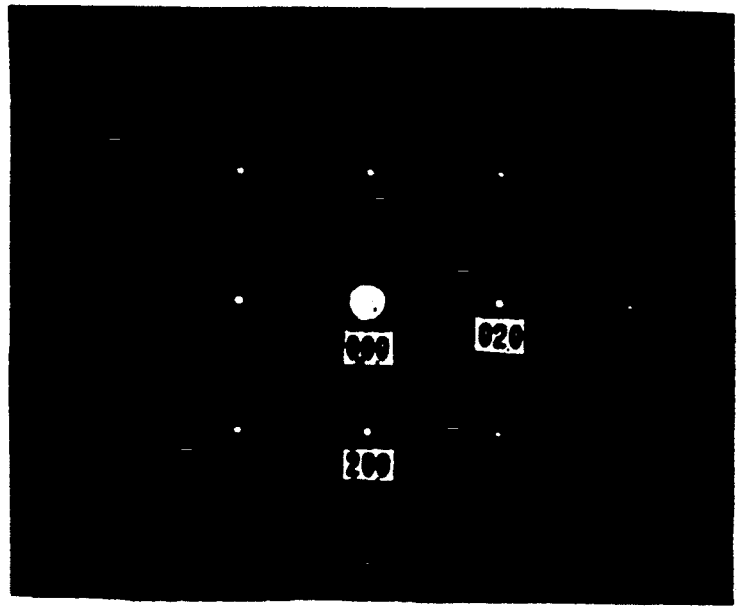
FIG. 4a is an electron diffraction image of stoichiometric B1-type tantalum nitride of the present invention (a) and that of B1-type tantalum nitride synthesized in USSR according to the combustion reaction in a nitrogen gas atmosphere, as it is shown here for reference in FIG. 4b.
Figure 4B:
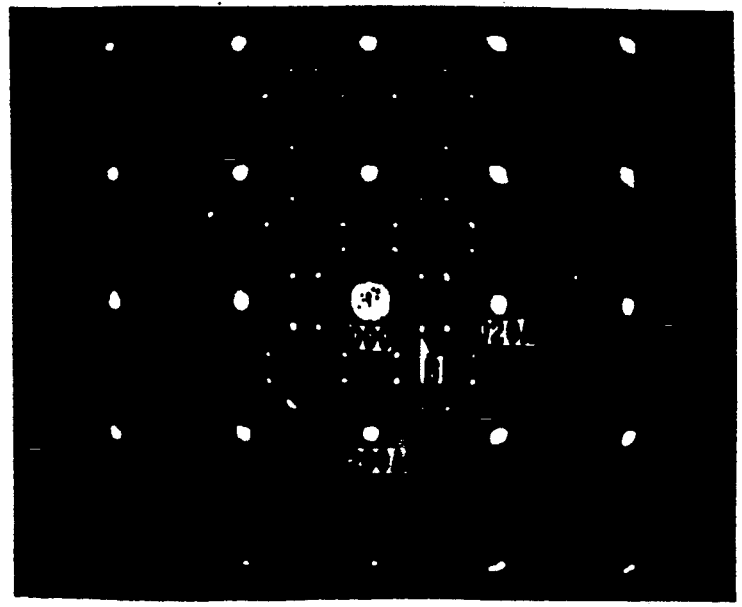
Figure 5:
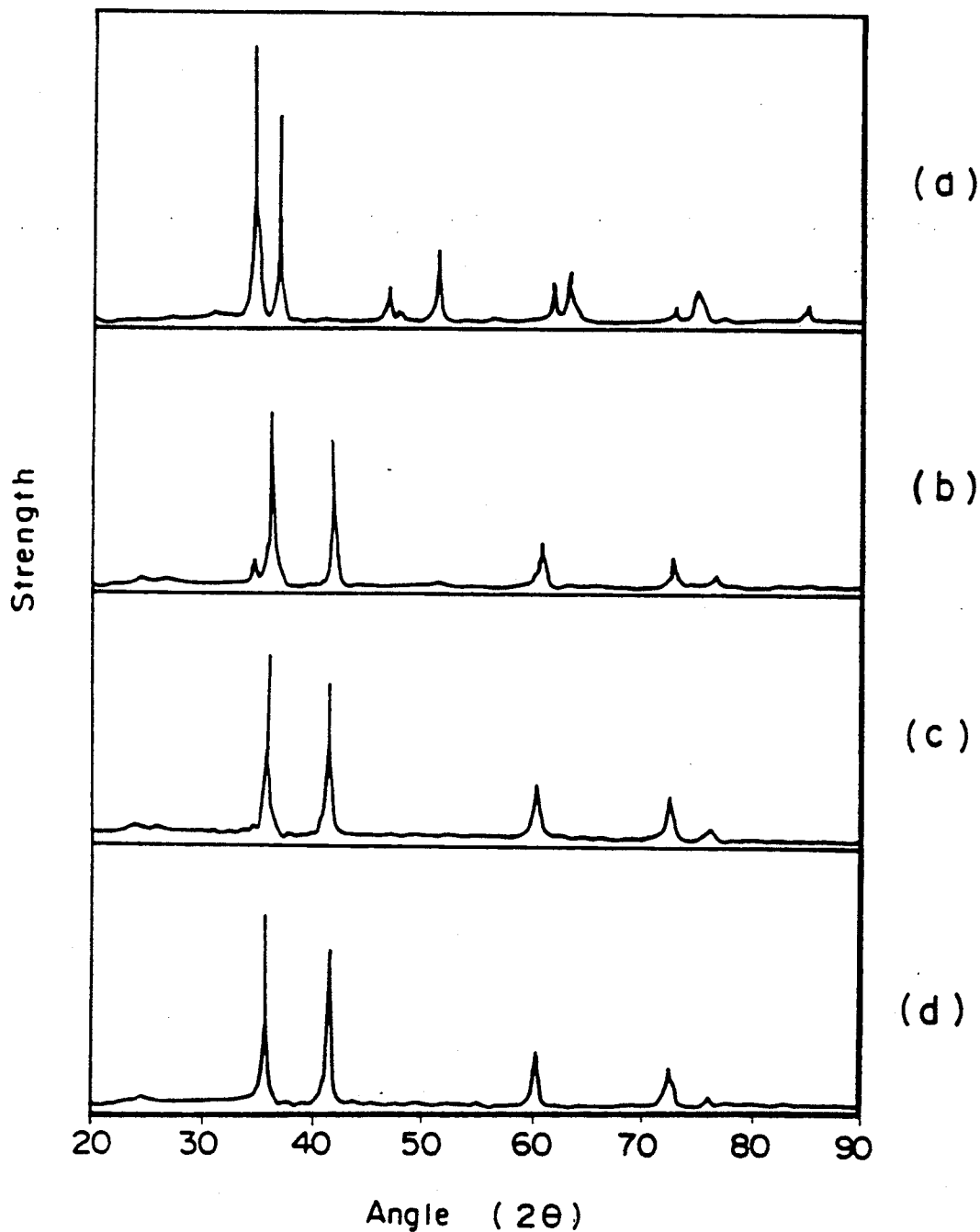

FIGS. 4a and 4b are electron diffraction images. FIG. 4a is the image obtained from the sample after impact. FIG. 4b is provided for reference and is the image obtained from B1-type phase synthesized in USSR by the combustion reaction in nitrogen gas atmosphere. For For the 100% recovered samples of the present experiment, only the diffraction spots representing the B1-structure appeared as shown in FIG. 4a to confirm that the stoichiometric composition of the starting material was retained. Moreover, indexing according to the B1-type structure was found feasible for all the diffraction images obtained from the samples as occurred at different angles of incidence. On the other hand, the diffraction image ascribed to the B1-type phase synthesized by the combustion reaction showed weak spots for which the vacancy (tantalum) or the regularization of excessive nitrogen atoms should be blamed, as shown in FIG. 4b. These spots are identified by the letter B in FIG. 4b. When these diffraction spots were analyzed, the unit cells having the long range ordered structure were found to be a tetragonal crystal system of $(2\sqrt{5}a) \times (a/2) \times (a/2)$. The results of the X ray diffraction also suggested awry lattices and moreover this sample had the smaller lattice constant (0.43124±0.00002 nm) than that of impact compression, so it appeared likely that those weak diffraction spots would be explained by the vacancies where tantalum atoms were missing.

Figure 2:
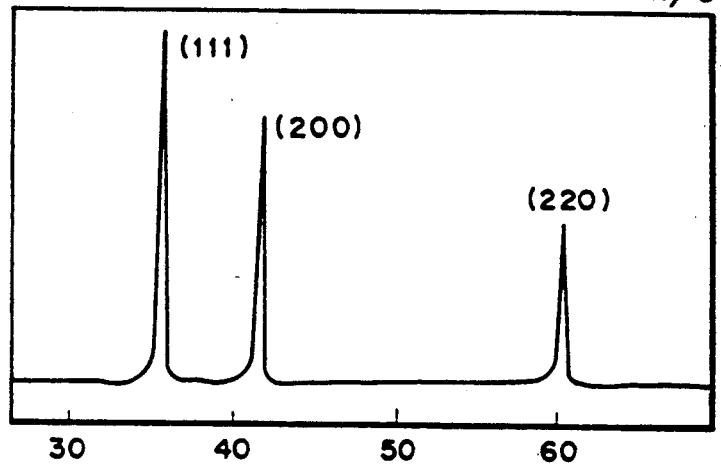
FIG. 2 is a diagram showing an X-ray powder diffraction pattern obtained from a recovered sample starting from the material with a porosity of 70% in case of the impact velocity of 1.419 km/s.

Further, FIG. 2 shows the X-ray powder diffraction pattern obtained from the sample produced from the powder having the cavity volume ratio of 70% which was subjected to the impact compression at the impact velocity of 1.42 Km/s. Herein, not only no peaks ascribed to the hexagonal crystal system emerged at all, but also the recovery rate of B1-type phase recovery was found rising to 100%.

Table 2 shows the value of the lattice spacing D (h, k, l) according to the Cu-K α X-ray powder diffraction patterns ascribed to the B1-type tantalum nitride made by both the impact compression and combustion reaction methods and the ideal D value of the B1-type phase which was calculated by applying the lattice constant as decided by the least squares and the equation $1/D^2 = (h^2 + K^2 + l^2)/a^2$. Also shown here is the difference between the measured value and the calculated value (deviation) and the maximum deviation occurred as 0.00015 nm in case of the combustion compression-made compound and 0.00011 nm in case of impact compression-made compound, proving that the latter had less awry crystals.

TABLE 2

Deviation of D on Various Crystal Planes of B1-Type TaN

| h,k,l | D (Measured Value) | D (Calculated Value) | Difference (Deviation) |
|---|---|---|---|

Combustion Reaction Method in a Nitrogen Gas Atmosphere

TABLE 2-continued

Deviation of D on Various Crystal Planes of B1-Type TaN

| h,k,l | D (Measured Value) | D (Calculated Value) | Difference (Deviation) |
|---|---|---|---|
| (Conventional Examples) | | | |
| 111 | 0.249131 | 0.249979 | 0.000152 |
| 200 | 0.215621 | 0.215622 | 0.000001 |
| 220 | 0.152464 | 0.152468 | 0.000004 |
| 311 | 0.130015 | 0.130025 | 0.000010 |
| 222 | 0.124472 | 0.124489 | 0.000017 |
| 400 | 0.107817 | 0.107811 | 0.000006 |
| 331 | 0.098918 | 0.098934 | 0.000016 |
| B1-type TaN of this Invention by Impact-compression Method | | | |
| 420 | 0.096446 | 0.096429 | 0.000017 |
| 111 | 0.250407 | 0.250359 | 0.000048 |
| 200 | 0.216709 | 0.216818 | 0.000109 |
| 220 | 0.153333 | 0.153313 | 0.000020 |
| 311 | 0.130745 | 0.130746 | 0.000011 |
| 222 | 0.125180 | 0.125180 | 0.000000 |
| 400 | 0.108421 | 0.108409 | 0.000012 |
| 331 | 0.099473 | 0.099483 | 0.000010 |
| 420 | 0.096965 | 0.096964 | 0.000001 |

Table 3 shows a result of chemical analysis of the resultant B1-type tantalum nitride synthesized by the present invention as compared with that of the starting material of hexagonal tantalum nitride.

TABLE 3

Result of Chemical Analysis

| | N (%) | O (%) | C (%) | z in $TaN_z$ |
|---|---|---|---|---|
| Starting Hexa-gonal TaN | 6.568 −6.708 | 0.553 −0.593 | 0.341 −0.381 | 0.974 −0.997 |
| Resultant B1-type TaN | 6.523 −6.663 | 0.581 −0.621 | 0.333 −0.373 | −0.960 −0.989 |

EXAMPLE 2

Table 3 shows the package of all examples of sintered body made according to the method set forth in the present specification. As used herein, V% means volume percent.

TABLE 4

| | Composition | | | Metal Amt. (V %) | Sintering Conditions | | Sintered Body Hard'ss |
|---|---|---|---|---|---|---|---|
| | Very Hard Subs. (V %) | C-Tan (V %) | High Melting Point Compound (V %) | | Press (Kb) | Temp (°C.) | |
| 1 | Diamond 80 | 15 | | 5 Co | 60 | 1500 | 8000 |
| 2 | CBN60 | 20 | 10(50 W—30 Ti—20 Ta) $N_7C_3$ | 10 Al | 55 | 1450 | 3700 |
| 3 | CBN55 | 25 | 10(50 W—30 Ti—20 Ta) $N_7C_3$ | 9 Al— 1 Co | 55 | 1450 | 3600 |
| 4 | CBN55 | 25 | 10(70 W—30 Ti)$N_7C_3$ | 9 Al— 1 Co | 55 | 1400 | 3600 |
| 5 | CBN50 | 30 | 10(70 W—30 Ti—20 Ta) $N_7C_3$ | 9 Al— 1 Co | 50 | 1400 | 3550 |
| 6 | CBN50 | 30 | 10(50 W—30 Zr—20 Ta) $N_7C_3$ | 9 Al— 1 Co | 50 | 1400 | 3500 |
| 7 | CBN50 | 30 | 10(70 W—30 Hf) $N_5C_5$ | 9 Al— 1 Si | 50 | 1400 | 3550 |
| 8 | CBN50 | 20 | 10(50 W—30 Ti—20 Ta) $N_7C_3$ + 10$Al_2O_3$ | 10 Al | 55 | 1500 | 3400 |
| 9 | | 80 | 10(50 W—30 Ti—20 Ta) $N_7C_3$ | 8 Al— 2 Co | 40 | 1350 | 2800 |
| 10 | | 60 | 10(50 W—30 Ti—20 Ta) $N_7C_3$ | 5 Al— 5 Co | 40 | 1350 | 2600 |
| 11 | | 50 | 20(70 W—30 Ti)$N_7C_3$ + 20(70 W—30 H5)$N_5C_5$ | 5 Al— 3 Ni— 2 Fe | 40 | 1400 | 2500 |
| 12 | | 40 | 30(50 W—30 Ti—20 Ta) $N_7C_3$ + 15(70 W—30 Zr) $N_5C_5$ | 5 Al— 5 Co— 5 Ni | 40 | 1350 | 2400 |

EXAMPLE 3

As shown in FIG. 3, a powder of hexagonal tantalum nitride having a mean particle size of 2~3 μm (3) was packed in an iron container (1), fixed by an iron plug (2) which was screwed so much so that the powder had a previously prescribed density. The container arranged as in FIG. 3 was laid on an apparatus wherein the container could be shocked by a powder propellent gun. Next, a tungsten laminated flyer plate (4) was hurtled at a high velocity by the combustion gas of the explosive, bumping into the container (1), developing a shock wave and propagating said shock wave to the inside of the compressed powder. The conditions of this experiment are shown in Table 1.

Comparative Example

A hexagonal tantalum nitride having a mean particle size of 2~3 μm was placed in a static ultrahigh pressure generator to obtain the sample 4 according to a comparative method comprising the conditions such as pressure of 60 kbar, temperature of 1500~1600 and treatment time of 30 minutes.

The samples 1, 2 and 3 of the present invention and the sample 4 of the comparative method were investigated by the X-ray diffraction (Cu target, K α ray) and as the result, zero percent of the sample 4 was found converted to the B1-type tantalum nitride, while the conversion to the B1-type tantalum nitride occurred at a high ratio such as 90% or more of the samples 1, 2 and 3, as shown in Table 1. Further, these samples were analyzed for the hydrogen content, with the result that the sample 4 had a tendency of having a lower hydrogen content by about 20 mol% and that the samples 1, 2 and 3 contained almost as much nitrides as their starting material.

We claim:

1. A method of synthesizing a stoichiometric cubic tantalum nitride, comprising the steps of:

providing a starting material selected from the group consisting of a powder mass, a compressed powder mass and a sintered mass comprising a stoichiometric hexagonal tantalum nitride having a porosity of 30% or above, propagating a shock wave to the starting material to develop a shock pressure of about 5 GPa or more, and converting the hexagonal tantalum nitride in the starting material to a cubic tantalum nitride.

2. A method of synthesizing a stoichiometric cubic tantalum nitride according to claim 1, wherein the porosity of the starting material is 50% or above.

3. A method of synthesizing a stoichiometric cubic tantalum nitride according to claim 1, wherein the porosity of the starting material is 70% or above.

4. A method according to claim 1, wherein said starting material further comprises a catalyst for converting the hexagonal tantalum nitride into the cubic tantalum nitride.

5. A method according to claim 1, wherein said stoichiometric hexagonal tantalum nitride has a mean particle size of 10 microns or less.

6. A method according to claim 1, wherein said stoichiometric hexagonal tantalum nitride has a mean particle size of 5 microns or less.

7. A method according to claim 1, wherein the shock wave is longitudinal, traverse, or oblique.

8. A method according to claim 1, wherein the starting material comprises a powder mass which consists essentially of stoichiometric hexagonal tantalum nitride.

9. A method according to claim 1, wherein the starting material comprises a compressed powder mass which consists essentially of stoichiometric hexagonal tantalum nitride.

10. A method according to claim 1, wherein the starting material comprises a sintered mass which consists essentially of stoichiometric hexagonal tantalum nitride.

11. The method according to claim 1, wherein the starting material is packed in a container and an explosive is placed outside the container.

12. The method according to claim 1, wherein the starting material is packed in a container which is placed in a metal cylinder, an explosive being placed between the container and the metal cylinder.

13. The method according to claim 1, wherein the starting material is packed in a container which is placed in a reactor and struck by a flyer plate.

14. A method according to claim 13, wherein said flyer plate is made of metal.

15. A method according to claim 13, wherein the flyer plate is hurtled by use of a compressed gas into the container.

16. A method according to claim 13, wherein the flyer plate is hurtled by use of a combustion gas into the container.

17. A method according to claim 13, wherein the flyer plate is hurtled at a velocity of 1.2 to 1.6 km/s into the container.

18. A method according to claim 13, wherein said flyer plate has a thickness of 2 mm.

19. A method according to claim 13, wherein said flyer plate is made of tungsten.

* * * * *